(12) United States Patent
Lee

(10) Patent No.: US 12,451,828 B2
(45) Date of Patent: Oct. 21, 2025

(54) MOTOR POSITION DETECTION DEVICE

(71) Applicant: LG INNOTEK CO., LTD., Seoul (KR)

(72) Inventor: Kun Min Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 168 days.

(21) Appl. No.: 18/269,874

(22) PCT Filed: Nov. 16, 2021

(86) PCT No.: PCT/KR2021/016768
§ 371 (c)(1),
(2) Date: Jun. 27, 2023

(87) PCT Pub. No.: WO2022/145721
PCT Pub. Date: Jul. 7, 2022

(65) Prior Publication Data
US 2024/0063743 A1 Feb. 22, 2024

(30) Foreign Application Priority Data
Dec. 28, 2020 (KR) .................. 10-2020-0184500

(51) Int. Cl.
| H02P 25/086 | (2016.01) |
| F16H 59/08 | (2006.01) |
| G01D 5/14 | (2006.01) |
| G01D 5/16 | (2006.01) |
| G01D 18/00 | (2006.01) |
| H02K 11/215 | (2016.01) |

(52) U.S. Cl.
CPC .......... *H02P 25/086* (2013.01); *F16H 59/08* (2013.01); *G01D 5/145* (2013.01); *G01D 5/16* (2013.01); *G01D 18/00* (2013.01); *H02K 11/215* (2016.01)

(58) Field of Classification Search
CPC ........ H02P 25/086; G01D 5/145; G01D 5/16; G01D 18/00; H02K 11/215; F16H 59/08
See application file for complete search history.

(56) References Cited

U.S. PATENT DOCUMENTS

| 9,093,933 B2 * | 7/2015 | Jang ................. H02K 11/21 |
| 10,348,224 B2 | 7/2019 | Einspieler et al. |
| 11,796,348 B2 * | 10/2023 | Liu ..................... G01D 5/145 |
| 11,946,773 B2 * | 4/2024 | Fujita ................. G01L 5/0042 |
| 2008/0130495 A1 | 6/2008 | Dos Remedios et al. |
| 2015/0061563 A1 * | 3/2015 | Jang ..................... H02P 7/0094 |
| | | 318/490 |

(Continued)

FOREIGN PATENT DOCUMENTS

| EP | 2 846 458 A1 | 3/2015 |
| JP | 2010276417 A * | 12/2010 |

(Continued)

*Primary Examiner* — Thai T Dinh
(74) *Attorney, Agent, or Firm* — Birch, Stewart, Kolasch & Birch, LLP

(57) ABSTRACT

The motor position detection device according to this embodiment comprises a rotor surrounding the rotation shaft of the motor; a substrate disposed to face the rotor; a Hall sensor disposed on one surface of the substrate to sense the rotation of the rotor; and an MR sensor disposed on the other surface of the substrate to sense the rotation of the rotor.

6 Claims, 7 Drawing Sheets

(56) References Cited

U.S. PATENT DOCUMENTS

2017/0176840 A1     6/2017  Zhou et al.
2018/0375450 A1*   12/2018  Schnell .................. H02P 6/181
2020/0309566 A1*   10/2020  Fujita .................... G01L 5/0042

FOREIGN PATENT DOCUMENTS

| JP | 2015-54672 A |   | 3/2015 |
|----|--------------|---|--------|
| JP | 6228669 B2   |   | 11/2017 |
| JP | 2018-64340 A |   | 4/2018 |
| JP | 2018064340 A | * | 4/2018 |
| TW | 201836257 A  |   | 10/2018 |

* cited by examiner

MOTOR POSITION DETECTION DEVICE

CROSS REFERENCE TO RELATED APPLICATIONS

This application is the National Phase of PCT International Application No. PCT/KR2021/016768, filed on Nov. 16, 2021, which claims priority under 35 U.S.C. § 119(a) to Patent Application No. 10-2020-0184500, filed in the Republic of Korea on Dec. 28, 2020, all of which are hereby expressly incorporated by reference into the present application.

TECHNICAL FIELD

The present invention relates to a motor position detection device, and more particularly, to a motor position detection device to which a heterogeneous sensor is applied.

BACKGROUND ART

A shift-by-wire system (SBW) applied to a vehicle comprises a switched reluctance motor (SRM) and an SBW control unit (SCU) that controls it. SBW controls the four stages P, R, N, and D by rotating the motor according to a signal when the shift button is manipulated.

An external inhibitor switch is required to check that the detent structure is properly fastened to each stage, but this causes a problem of lack of space in a vehicle. In addition, a design that detects a motor position using only two identical Hall sensors has a problem of being vulnerable to dependent failure.

DETAILED DESCRIPTION OF THE INVENTION

Technical Subject

The technical subject to be solved by the present invention is to provide a motor position detection device to which a heterogeneous sensor is applied.

The subjects of the present invention are not limited to the subjects mentioned above, and other subjects not mentioned will be clearly understood by those skilled in the art from the following description.

Technical Solution

In order to solve the above technical subject, a motor position detection device according to an embodiment of the present invention comprises: a rotor surrounding the rotation shaft of a motor; a substrate disposed to face the rotor; a Hall sensor disposed on one surface of the substrate to sense the rotation of the rotor; and an MR sensor disposed on the other surface of the substrate to sense the rotation of the rotor.

It may include: a rotation speed determination unit receiving a first signal from the MR sensor and determining the rotation speed of the motor; a position determination unit receiving a rotation speed signal of the motor from the rotation speed determination unit, receiving a second signal from the Hall sensor to determine a rotational position of the motor, and generating a motor integrated position using the rotation speed signal of the motor and the rotational position of the motor; and a control unit for outputting a control signal to the motor using the motor integrated position received from the position determination unit.

The control unit may control motor driving by comparing the integrated motor position determined using the rotational position of the motor and the rotation speed of the motor in the position determining unit with a shift command of a driver.

The control unit may diagnose a failure based on whether the rotation speed of the motor calculated from the second signal and the rotation speed of the motor determined from the first signal are within a normal range.

The MR sensor includes a first MR sensor and a second MR sensor, the rotation speed determining unit receives a first-first signal from the first MR sensor and determines the rotation speed of the motor, and the position determination unit may determine the rotation speed of the motor by receiving a first-second signal from the second MR sensor.

The control unit may diagnose the failure by comparing the rotation speed of the motor determined from the first MR sensor with the rotation speed of the motor determined from the second MR sensor.

The position determination unit may determine the rotational speed of the motor through the rotational position of the motor determined from the Hall sensor and the rotational position of the motor determined from the second MR sensor.

The Hall sensor may include first and second Hall sensors, and the first and second Hall sensors may be disposed on the one surface of the substrate by forming an angle of 90 degrees to be overlapped with a radius of the rotor.

The MR sensor may be disposed on the other surface of the substrate to be overlapped with a central region of the radius of the rotor.

The Hall sensor and the MR sensor may be disposed so as not to be overlapped with each other on the substrate.

Advantageous Effects

According to an embodiment of the present invention, the rotational position of a motor can be detected in real time by a combination of a motor rotational position and a rotation speed outputs through different magnetic sensors on a substrate.

In addition, since the motor position is determined in real time, the design freedom of the detent-spring structure may be increased.

In addition, since the rotational position of the motor is detected through heterogeneous sensors through Hall sensor and MR sensor, dependent failure can be prepared and high failure coverage can be secured.

In addition, since the guaranteed position can be detected through third-party verification, the inhibitor switch, which is external verification hardware, can be eliminated, thereby securing space and reducing costs.

The effect according to the present invention is not limited by the contents exemplified above, and more various effects are included in the present specification.

BEST MODE

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

Figure 1:
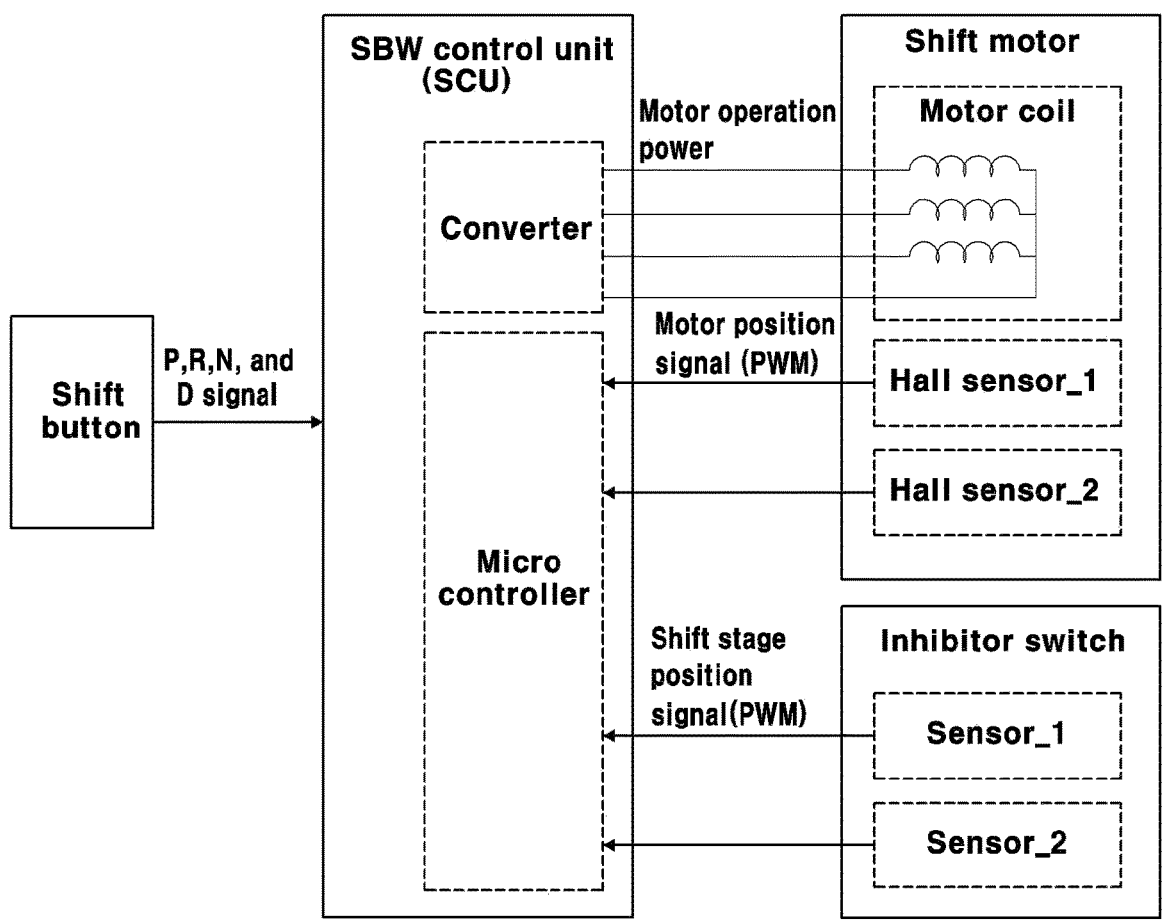
FIG. 1 illustrates a motor position detection device of the prior art.

FIG. 1 illustrates an existing motor position detection device. Referring to FIG. 1, when a driver operates a shift button, a shift-by-wire (SBW) may control four stages P, R, N, and D by rotating a motor using an electrical signal. The inhibitor switch measures the position of the shift stages P, R, N, and D in the system and transmits it to the SCU (SBW control unit) as a PWM signal. The motor transmits the motor position signal as a PWM signal to the SCU using a Hall sensor (encoder). In this case, the motor control system consists of a separate type of motor, SCU, and inhibitor switch; and input/output of each signal is configured using a connector and a wiring harness.

In such a motor control system of the prior art, a motor-SCU separate structure occupies a lot of space compared to a motor-controller integrated structure, and this becomes a pain point for domestic and foreign automakers facing a space shortage as the number of vehicle E/E systems increases. In addition, the need for a connector and a wire according to a separable structure causes an increase in cost due to a mold cost and the like. In addition, the Hall sensor has a problem in that the control precision of the motor is lowered due to limited sensitivity, and the motor control through this may cause an accident due to low responsiveness to shift level recognition and control, and when the mechanism fastened by the detent spring is separated due to disturbance such as irregularities of the road surface, it may cause an accident due to the inability of fast recognition and control. In addition, a separate wire used for input/output of each signal may cause an increase in a relative physical distance and unnecessary signal loss due to resistance thereof and signal distortion due to external noise. In addition, a design using two identical Hall sensors is vulnerable to dependent failure, so there is a problem in that the safety rating is lowered. In addition, an external inhibitor switch is required to measure the position of the gear stage, however, when the external inhibitor switch fails, the gear position cannot be determined, so the vehicle cannot be driven.

The present embodiment is to solve the above problems, and is a motor position detection device to which a heterogeneous sensor is applied.

Figure 2:
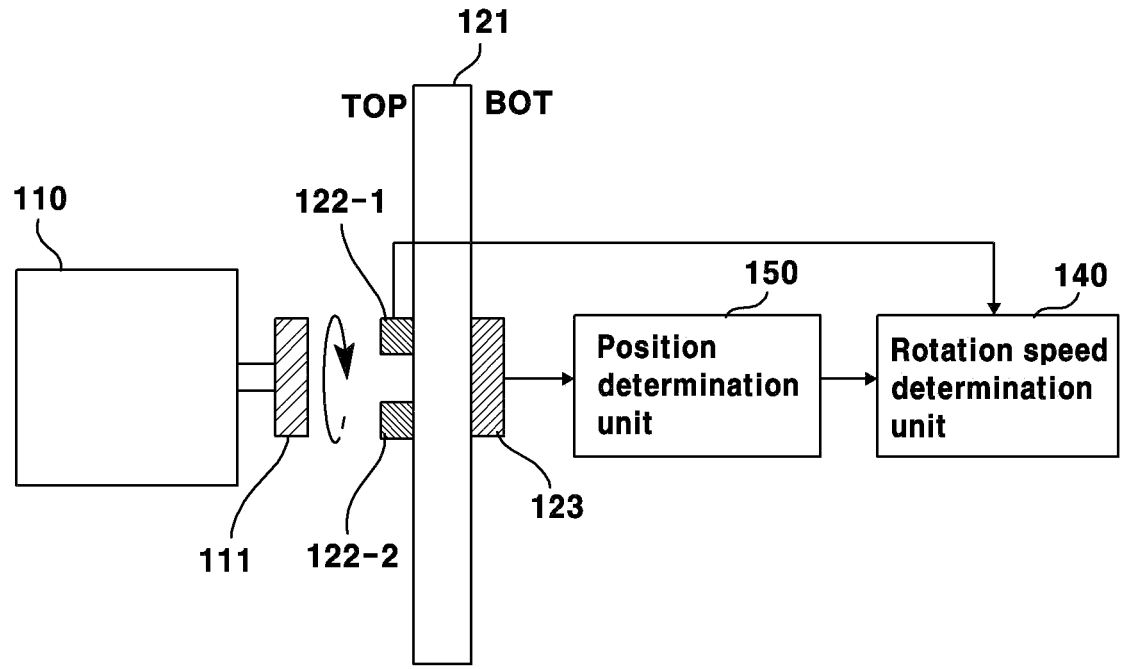
FIG. 2 illustrates a motor position detection device according to an embodiment of the present invention.
Figure 3:
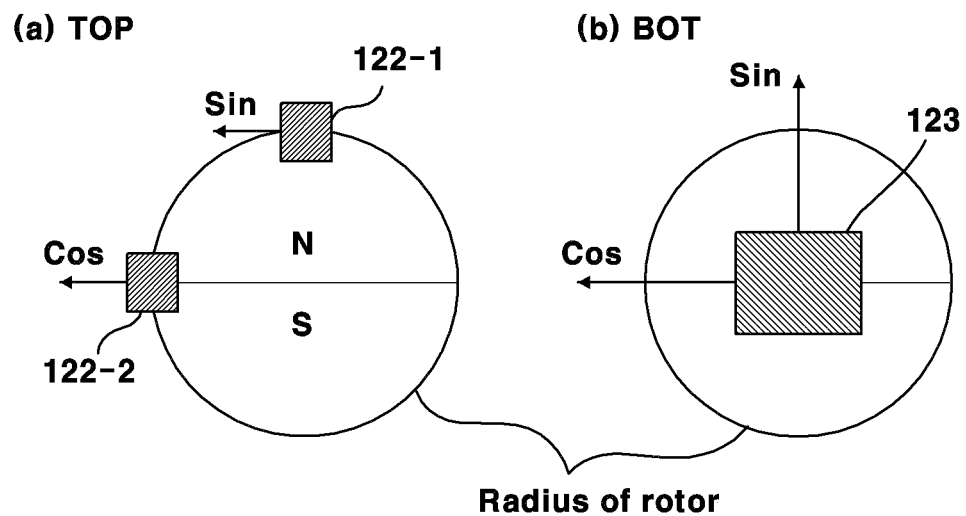
FIG. 3 illustrates the arrangement of each sensor of a motor position detection device according to an embodiment of the present invention.
Figure 4:
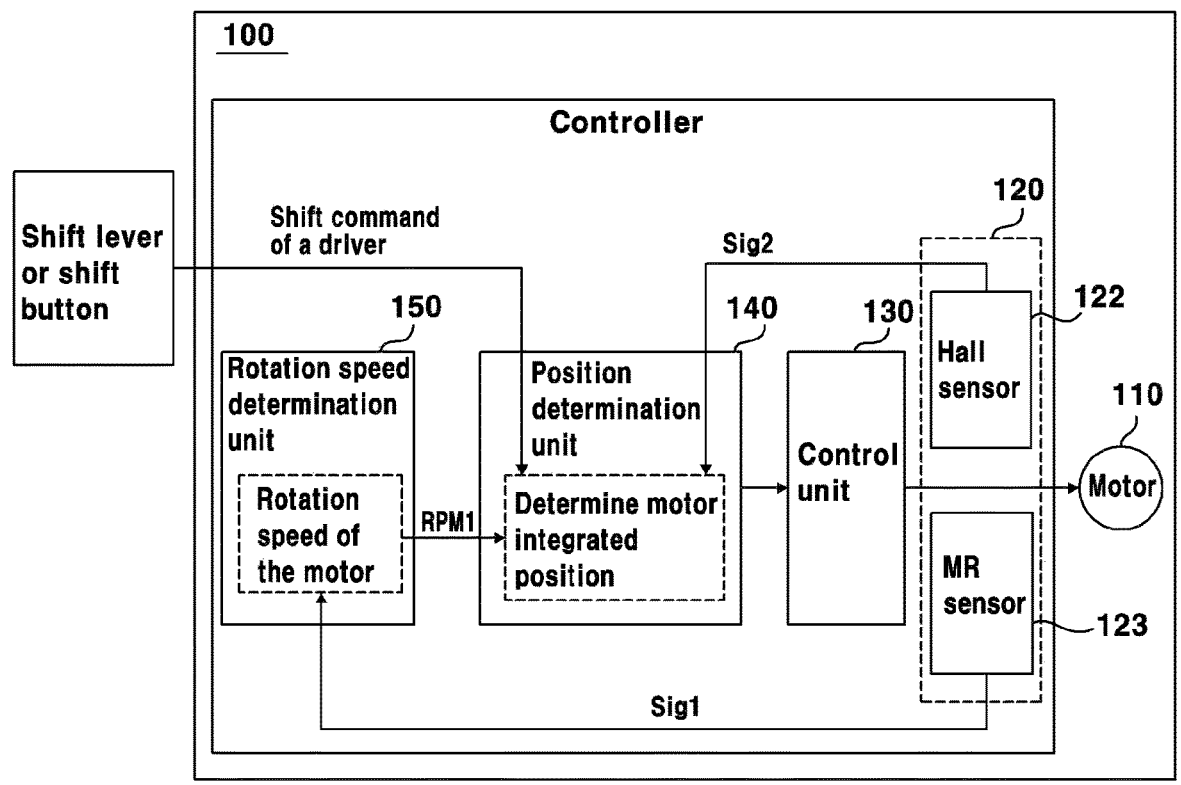
FIG. 4 illustrates a block diagram of a motor position detection device according to an embodiment of the present invention.
Figure 5:
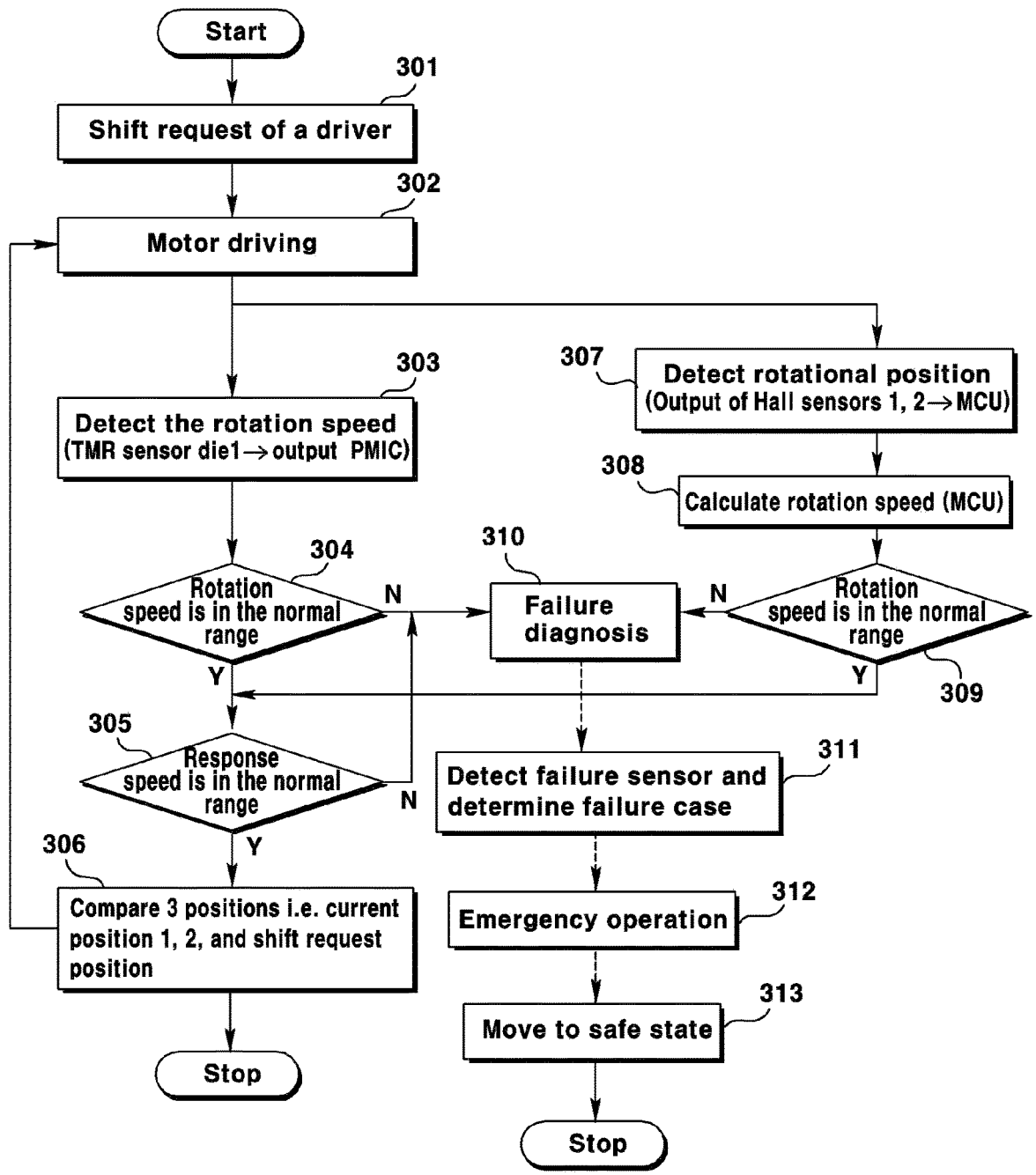
FIG. 5 is an operation flowchart of a motor position detection device according to an embodiment of the present invention.

Hereinafter, a motor position detection device according to an embodiment of the present invention will be described with reference to FIGS. 2 to 5. FIG. 2 illustrates a motor position detection device according to an embodiment of the present invention; FIG. 3 illustrates the arrangement of each sensor of a motor position detection device according to an embodiment of the present invention; FIG. 4 illustrates a block diagram of a motor position detection device according to an embodiment of the present invention; and FIG. 5 is an operation flowchart of a motor position detection device according to an embodiment of the present invention.

The motor position detection device 100 according to an embodiment of the present invention has a structure in which the motor 110 and the controller are integrally combined. The controller includes a sensor unit 120, a control unit 130, a position determination unit 140, and a rotation speed determination unit 150.

The sensor unit 120 according to an embodiment of the present invention may include a Hall sensor 122 and an MR sensor 123 disposed on a substrate 121.

More specifically, the sensor unit 120 may be disposed to face the rotor 111 surrounding the rotation shaft of the motor 110 to sense the rotation of the motor 110. The rotor 111 may be a single-sided two-pole magnetizing magnet to which one N pole and one S pole are attached. The rotor 111 may be a disk-shaped circular magnet or a donut-shaped ring-shaped magnet. The rotor 111 may be of an end shaft type attached to one end of the shaft inside the motor 110, or a through shaft type fitted into one end of the shaft.

The sensor unit 120 may include a Hall sensor 122 and an MR sensor 123. As such, since the sensor unit 120 detects the rotation of the motor 110 with a heterogeneous sensor, it is possible to enhance accuracy, prepare for dependent failures or increase failure coverage, and satisfy ASIL rating requirements. Here, dependent failures may mean failures due to a common cause or linked failure, and failure coverage may mean a probability of detecting failures.

The Hall sensor 122 of the sensor unit 120 may be disposed on one surface of the substrate 121 and the MR sensor 123 may be disposed on the other surface of the substrate. The Hall sensor 122 may be disposed to face the rotor 111, and the MR sensor 123 may be disposed to face the same direction as the rotor 111 from the opposite side of the substrate 121 on which the Hall sensor 122 is disposed. Conversely, the MR sensor 123 may be disposed to face the rotor 111, and the Hall sensor 122 may be disposed to face the same direction as the rotor 111 on the other surface of the substrate 121 on which the MR sensor 123 is disposed. In general, the Hall sensor 122 needs to be disposed relatively close to the rotor 111 in order to sense the rotation of the motor 110, but since the MR sensor 123 has higher sensing sensitivity than the Hall sensor 122, it may be disposed relatively far from the rotor 111.

The sensor unit 120 may partially overlap with the rotation radius of the rotor 111 or may be disposed to be included in an inner region. Specifically, since two Hall sensors 122 sense as a set, the Hall sensors 122 may be disposed to be overlapped with a rotation radius of the rotor 111. The Hall sensor 122 includes first and second Hall sensors 122-1 and 122-2, and the first and second Hall sensors 122-1 and 122-2 may be disposed to form an angle of 90 degrees to be overlapped with the radius of the rotor 111. When the first Hall sensor 122-1 senses a sin value of the motor rotation, the second Hall sensor 122-2 may sense a cos value of the motor rotation.

The MR sensor 123 of the sensor unit 120 may be disposed to be overlapped with the central region of the rotation radius of the rotor 111. The MR sensor 123 may be disposed to be overlapped with the Hall sensor 122 disposed on the opposite side of the substrate 121, and may be disposed not to be overlapped with. Since the MR sensor 123 senses a change in the magnetic field of the rotor 111, the sensing sensitivity may be enhanced when it is not overlapped with the Hall sensor 122. Referring to FIG. 4, the rotation speed determining unit 150 may receive the first signal Sig1 from the MR sensor 123 to determine the rotation speed of the motor 110. The rotation speed determination unit 150 may be a power supply unit, and may be configured as a power supply unit (PSU) or Power Supply IC or Power Management IC (PMIC) capable of diagnosing its own failure. Here, since the operation principle of the MR sensor 123 sensing the rotation speed of the motor is obvious to those skilled in the art, a detailed description thereof will be omitted.

The position determination unit 140 receives the rotation speed signal RPM1 of the motor 110 from the rotation speed determination unit 150, and may determine the rotational position of the motor 110 by receiving the second signal Sig2 from the Hall sensor 122. In addition, an integrated position of the motor may be generated using the rotation speed signal of the motor 110 and the rotational position of the motor 110. The position determination unit 140 may be a microcontroller unit (MCU). Here, since the operation principle of the Hall sensor 122 sensing the rotational position of the motor is obvious to those skilled in the art, a detailed description thereof will be omitted.

The position determination unit 140 may determine whether the motor 110 is operating normally through the rotational position of the motor 110 sensed from the Hall sensor 122 and the rotation speed of the motor 110 sensed from the MR sensor 123 in real time, and may determine the integrated position of the motor 110 by additionally comparing it with a shift command of a driver. When the integrated position of the motor 110 generated by the position determination unit 140 is transmitted to the control unit 130, the control unit 130 may output a control signal to the motor 110 using the integrated position of the motor 110.

Next, with reference to FIG. 5, failure diagnosis and operation through the motor position detection device 100 will be described.

First, a motor driving is started (302) according to a shift request of a driver (301). When the rotor rotates according to the motor driving, the PMIC detects the rotation speed from the MR sensor (303), checks whether the rotation speed is in the normal range (304), and when it does not fall within a normal range, a failure diagnosis is made (310), and when the response speed is in the normal range, checks whether the response speed is within the normal range (306). When the response speed does not fall within the normal range, a failure diagnosis (310) is made, and when the response speed falls within the normal range, the rotational position detected from the MR sensor and the Hall sensor is compared with the shift request position of a driver to additionally control the motor. In addition, when the rotor rotates according to the motor driving, the MCU detects a rotational position from the Hall sensor (307) and calculates the rotation speed (308). Checks whether the calculated rotation speed is in the normal range (309), and when rotation speed is in the normal range, checks whether the above-described response speed is in the normal range (306) and proceeds a step of comparing the rotational position detected from the MR sensor and the Hall sensor with the driver's shift request position (307). When the rotation speed does not correspond to the normal range, a failure diagnosis is performed (310). When a failure diagnosis is made because the rotation speed detected from the MR sensor and the rotation speed detected from the Hall sensor do not correspond to a normal range (310), determines according to failure sensor detection and the failure case (311) and proceeds with an emergency operation mode (312), and operates in a safe state mode (313). Hereinafter, an operation mode for each failure case according to the failure diagnosis 310 will be described.

A method for detecting a failure sensor according to the failure diagnosis (310) and determining the rotational position of the motor for each failure case (311) is as follows. In Case 1, when the first Hall sensor 122-1 for detecting a cos value among the two Hall sensors 122 fails, the matchability between a sin value of the second Hall sensor 122-2 and the sin value of the MR sensor 123 is determined. When the two values match, the rotational position of the motor is determined using a sin value and a cos value of the MR sensor 123.

In Case 2, when the second Hall sensor 122-2 detecting a sin value among the two Hall sensors 122 fails, the matchability between the cos value of the first Hall sensor 122-1 and the cos value of the MR sensor 123 is determined. When the two values match, the rotational position of the motor is determined using the sin value and the cos value of the MR sensor 123.

In Case 3, when the MR sensor 123 fails, the rotational position of the motor can be determined using the first Hall sensor 122-1 for detecting the cos value and the second Hall sensor 122-2 for detecting the sin value. After controlling the motor with an emergency operation (312) as described above, the control unit may notify the host controller of the failure, and thus may operate in a safe state mode (313).

Figure 6:
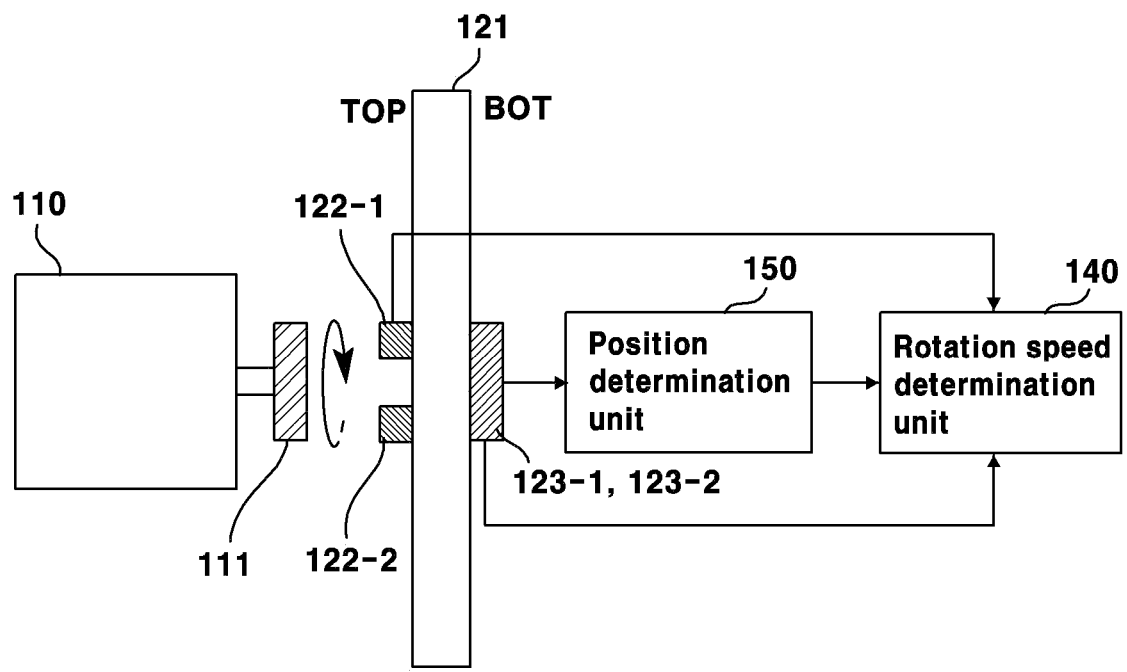
FIG. 6 illustrates a motor position detection device according to another embodiment of the present invention.
Figure 7:
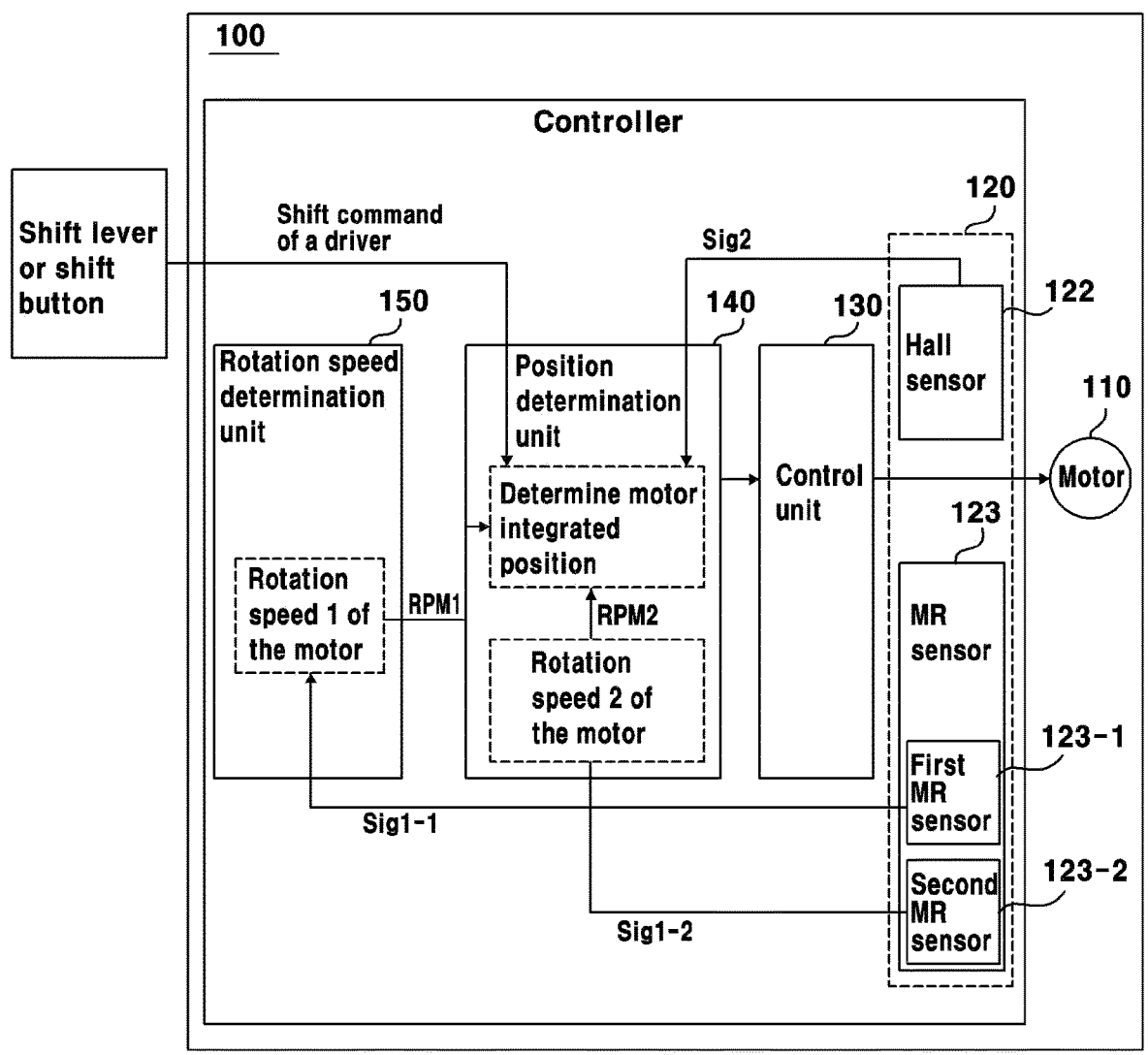
FIG. 7 illustrates a block diagram of a motor position detection device according to another embodiment of the present invention.
Figure 8:
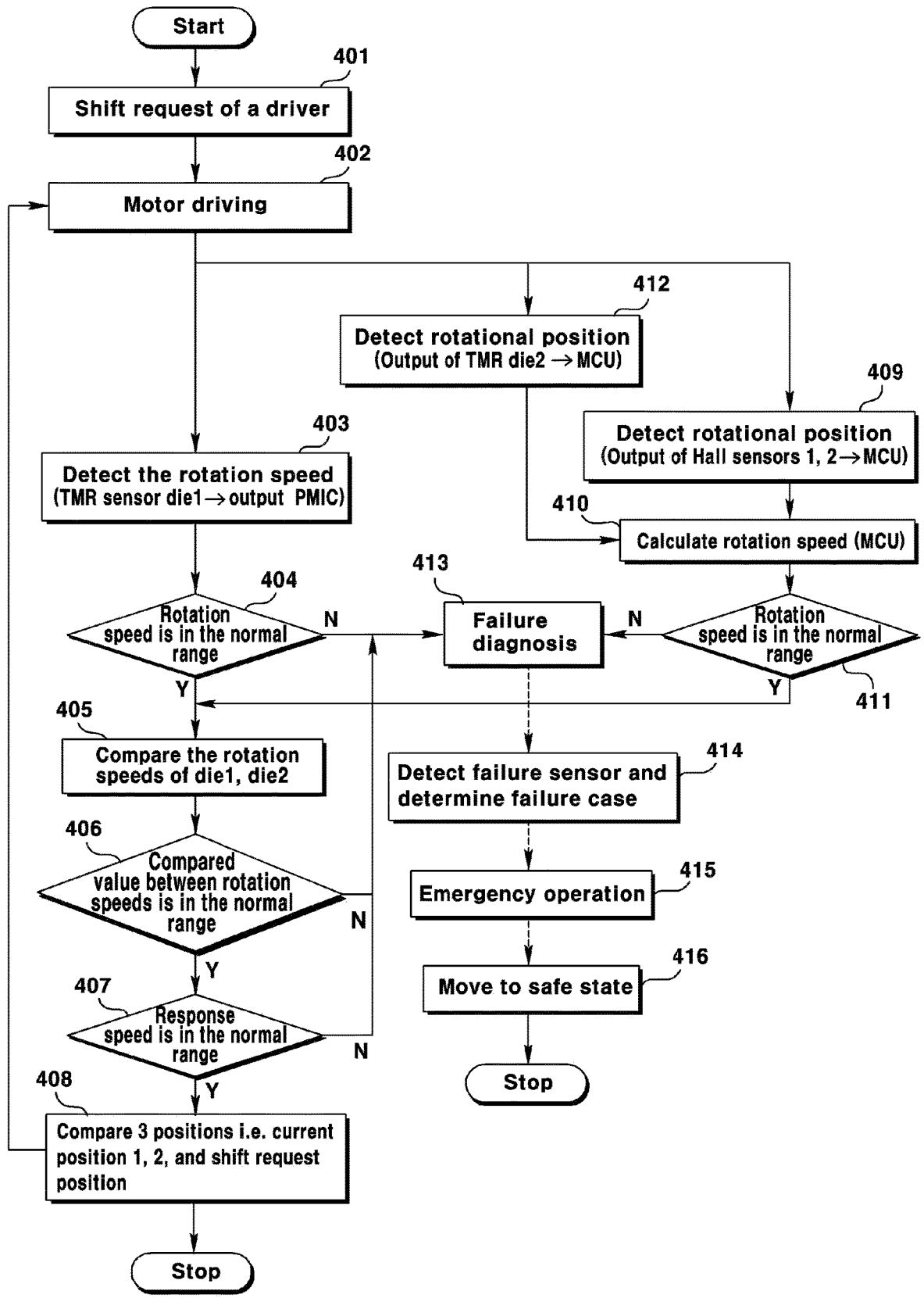
FIG. 8 is an operation flowchart of a motor position detection device according to another embodiment of the present invention.

A motor position detection device according to another embodiment of the present invention will be described with reference to FIGS. 6 to 8.

While the motor position detection device according to an embodiment of the present invention includes one MR sensor 123 formed of a single die, a motor position detection device according to another embodiment of the present invention may include two MR sensors 123 formed of a dual die. Safety can be enhanced by using the motor position information sensed by each of the two MR sensors 123. The two MR sensors 123 may be disposed in parallel on the substrate 121 to be connected to each other, and may be stacked on each other on the substrate 121. Another embodiment of the present invention will be mainly described with a configuration different from the one embodiment of the present invention described above; however, overlapped descriptions will be omitted.

The MR sensor 123 may include a first MR sensor 123-1 and a second MR sensor 123-2. The rotation speed determination unit 150 receives the first-first signal from the first MR sensor 123-1 and determines the rotation speed of the motor, and the position determination unit 140 may receive the first-second signal from the second MR sensor 123-2 to determine the rotation speed of the motor. The position determination unit 140 receives the rotation speed signal RPM1 of the motor from the rotation speed determination unit 150, and may generate the rotation speed signal RPM2 of the motor from the first-second signal received from the second MR sensor 123-2. The position determination unit 140 may generate an integrated position of the motor through the rotation speed signals RPM1 and RPM2 of the motor, the rotational position Sig2 of the motor, and a shift command of a driver. The control unit 130 may control the motor using the integrated position of the motor generated by the position determination unit 140.

Next, failure diagnosis and operation through the motor position detection device will be described with reference to FIG. 8.

First, the motor driving 402 is started according to a shift request of a driver (401). When the rotor rotates according to the motor driving, the PMIC detects the rotation speed from the first MR sensor (403); checks whether the rotation speed is in the normal range (404); when it does not fall within the normal range, failure diagnosis is made (413); when it corresponds to the normal range, the rotation speed of the first MR sensor and the second MR sensor are compared (406). When the compared rotation speed does not fall within the normal range, a failure diagnosis is made (413); and when it is within the normal range, checks whether the response speed is within the normal range (407). When the response speed does not fall within the normal range, a failure diagnosis is made (413); when the response speed falls within the normal range, the rotational position detected from the two MR sensors and the two Hall sensors is compared with a shift request position of a driver (408) to further control the motor.

In addition, when the rotor rotates according to the motor driving (402), the MCU detects a rotational position from the Hall sensor (409), and detects the rotational position from the second MR sensor (412) to calculate the rotation speed (410). Check whether the calculated rotation speed is in the normal range (411), and when the rotation speed is in the normal range, the rotation speed of the above-described first MR sensor and the second MR sensor is compared (405); check whether the compared rotation speed is in the normal range (406) and whether the response speed is within the normal range (407); and proceed a step of comparing the rotational position detected from the MR sensor and the Hall sensor and the driver's shift request position is performed (408). When the rotation speed does not fall within the normal range, a failure diagnosis is made (413). When the failure diagnosis is made (413), such as the rotation speed detected by the MR sensor and the rotation speed detected from the Hall sensor do not correspond to a normal range, the failure sensor is detected and determined according to the failure case (414); an emergency operation mode (415) is proceeded; and it is operated in a safe state mode (416). Hereinafter, an operation mode for each failure case according to the failure diagnosis (413) will be described.

A failure sensor is detected according to the failure diagnosis (413) and the rotational position determination method of the motor for each failure case (414) is as follows. In Case 1, when the first Hall sensor 122-1 for detecting the cos value among the two Hall sensors 122 fails, the matchability of the sin value of the second Hall sensor 122-2 and the sin value of the MR sensor 123 is determined. When the two values match, the rotational position of the motor is determined using the sin value and the cos value of the MR sensor 123.

In Case 2, when the second Hall sensor 122-2 detecting a sin value among the two Hall sensors 122 fails, the matchability of the cos value of the first Hall sensor 122-1 and the cos value of the MR sensor 123 is determined. When the two values match, the rotational position of the motor is determined using the sin value and the cos value of the MR sensor 123.

In Case 3, when the MR sensor 123 fails, the rotational position of the motor using the first Hall sensor 122-1 for detecting the cos value and the second Hall sensor 122-2 for detecting the sin value can be determined. After controlling the motor through the emergency operation 415 as described above, the control unit may notify the host controller of the failure, and thus may operate in the safe state mode 416.

Although the embodiments of the present invention have been described above with reference to the accompanying drawings, those of ordinary skill in the art to which the present invention belongs may be able to understand that the present invention can be implemented in other specific forms without changing its technical spirit or essential features. Therefore, it should be understood that the embodiments described above are illustrative in all respects and not restrictive.

The invention claimed is:
1. A motor position detection device comprising:
a rotor surrounding a rotation shaft of a motor;
a substrate disposed to face the rotor;
a Hall sensor disposed on one surface of the substrate to sense a rotation of the rotor;
an MR sensor disposed on the other surface of the substrate to sense the rotation of the rotor;
a rotation speed determination unit receiving a first signal from the MR sensor and determining a rotation speed of the motor;
a position determination unit receiving a rotation speed signal of the motor from the rotation speed determination unit, receiving a second signal from the Hall sensor to determine a rotational position of the motor, and generating a motor integrated position using the rotation speed signal of the motor and the rotational position of the motor; and a control unit for outputting a control signal to the motor using the motor integrated position received from the position determination unit, wherein the control unit diagnoses a failure based on whether the rotation speed of the motor calculated from the second signal and the rotation speed of the motor determined from the first signal are within a normal range, wherein the control unit controls motor driving by comparing the integrated motor position determined using the rotational position of the motor and the rotation speed of the motor in the position determining unit with a shift command of a driver, wherein the Hall sensor and the MR sensor are disposed so as not to be overlapped with each other on the substrate, wherein one surface of the substrate faces the rotor, and wherein the distance between the rotor and the Hall sensor is smaller than the distance between the rotor and the MR sensor.

2. The motor position detection device according to claim 1, wherein the MR sensor includes a first MR sensor and a second MR sensor, wherein the rotation speed determining unit receives a first-first signal from the first MR sensor and determines the rotation speed of the motor, and wherein the position determination unit determines the rotation speed of the motor by receiving a first-second signal from the second MR sensor.

3. The motor position detection device according to claim 2, wherein the control unit diagnoses the failure by comparing the rotation speed of the motor determined from the first MR sensor with the rotation speed of the motor determined from the second MR sensor.

4. The motor position detection device according to claim 2, wherein the position determination unit determines the rotational speed of the motor through the rotational position of the motor determined from the Hall sensor and the rotational position of the motor determined from the second MR sensor.

5. The motor position detection device according to claim 1, wherein the Hall sensor includes first and second Hall sensors, and wherein the first and second Hall sensors are disposed on the one surface of the substrate by forming an angle of 90 degrees to be overlapped with a radius of the rotor.

6. The motor position detection device according to claim 1, wherein the MR sensor is disposed on the other surface of the substrate to be overlap with a central region of the radius of the rotor, and wherein the rotor, the Hall sensor, the substrate and the MR sensor are arranged in sequence.

* * * * *